United States Patent
Kurosawa et al.

(10) Patent No.: US 6,271,912 B1
(45) Date of Patent: Aug. 7, 2001

(54) FILM SCANNING DEVICE

(75) Inventors: Yuichi Kurosawa; Yasuhiro Yamamoto, both of Tokyo; Shuzo Seo, Saitama-ken, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/472,243

(22) Filed: Dec. 27, 1999

(30) Foreign Application Priority Data

Dec. 28, 1998 (JP) .................................................. 10-374681

(51) Int. Cl.⁷ .............................. G03B 27/62; H04N 1/04; H04N 1/46
(52) U.S. Cl. .............................. 355/75; 355/40; 358/487; 358/496
(58) Field of Search ................................... 355/72, 74, 75, 355/50, 40–41; 358/487, 496, 498; 348/96–97; 396/415, 416

(56) References Cited

U.S. PATENT DOCUMENTS

| | | | |
|---|---|---|---|
| 5,933,222 | * 8/1999 | Hoshino et al. | 355/75 |
| 5,995,201 | * 11/1999 | Sakaguchi | 355/55 |
| 6,088,084 | * 7/2000 | Nishio | 355/75 |
| 6,175,406 | * 1/2001 | Iizuka et al. | 355/75 |

* cited by examiner

Primary Examiner—Russell Adams
Assistant Examiner—Henry Hung Nguyen
(74) Attorney, Agent, or Firm—Greenblum & Bernstein P.L.C.

(57) ABSTRACT

A film scanner is provided with a line sensor for capturing an image formed on a film in a principal scanning direction, and a scanning mechanism for moving the film relative to the line sensor in an auxiliary scanning direction, which is perpendicular to the principal scanning direction. The scanning mechanism is provided with: a film holder for holding the film; a table for slidably mounting the film holder, the film holder being slidable in the auxiliary scanning direction; and a first driving system which drives the table in the auxiliary scanning direction at a first predetermined speed; and a second driving system which drives the film holder in the auxiliary scanning direction at a second predetermined speed, the second predetermined speed being faster than the first predetermined speed.

8 Claims, 11 Drawing Sheets

FILM SCANNING DEVICE

BACKGROUND OF THE INVENTION

The present invention relates to a film scanning device for capturing images formed on a photographing film.

Recently, in association with widespread use of personal computers, images captured by digital still cameras and/or scanned by scanners are often processed by the personal computers. In order to make use of images photographed with photographing films (i.e., images formed on silver-salt films), a film scanner has been developed and used.

An example of a film scanner is provided with a sensor such as a CCD (Charge Coupled Device) line sensor. By the CCD line sensor, an image on the photographing film is scanned in one direction (i.e., in a principal scanning direction), and by moving the CCD line sensor relative to the image in a direction perpendicular to the principal scanning direction (i.e., in an auxiliary scanning direction), the electronic image can be obtained (i.e., the image is scanned and image data corresponding to the scanned image is generated).

In such a film scanner, in order to scan the image accurately, a pre-scanning may be performed generally before a normal, or a main-scanning is performed. The pre-scanning is performed to check the orientation, position and the like of the image to be scanned, while the main-scanning is performed to obtain the image data. In view of the purpose, the pre-scanning need not be performed at high resolution. Further, it is preferable that the pre-scanning is performed at relatively a high speed, and a pre-view image is provided immediately for a user of the film scanner.

In the conventional film scanner, when the pre-scanning is performed, the number of auxiliary scanning operations is reduced by performing the principal scanning operation only at every predetermined number of auxiliary scanning pitch. In such a system, however, the moving speed of the line sensor with respect to the image is unchanged even if the pre-scanning is performed, and only the quantity of data is different. Therefore, the scanning period is substantially the same regardless whether the pre-scanning or main scanning is performed.

SUMMARY OF THE INVENTION

It is therefore an object of the invention to provide an improved film scanning device, with which a scanning period for the pre-scanning operation is reduced with respect to the normal scanning operation.

For the above object, according to the present invention, there is provided a film scanner which is provided with: a line sensor for capturing an image formed on a film in a principal scanning direction; and a scanning mechanism for moving the film relative to the line sensor in an auxiliary scanning direction, which is perpendicular to the principal scanning direction. The scanning mechanism is provided with: a film holder for holding the film; a table for slidably mounting the film holder, the film holder being slidable in the auxiliary scanning direction; and a first driving system which drives the table in the auxiliary scanning direction at a first predetermined speed; and a second driving system which drives the film holder in the auxiliary scanning direction at a second predetermined speed, the second predetermined speed being faster than the first predetermined speed.

Since the two distinct driving systems driving the table and the film holder at respective speeds. Thus, it is possible to drive the film holder at a fast speed and to execute the pre-scanning quickly.

Optionally, the first driving system may include a first driving mechanism which moves the table at the first predetermined speed, and the second driving system may include the first driving mechanism and a second mechanism which moves the film holder with respect to the table. In this case, a sum of the first predetermined speed and a speed at which the second mechanism moves the film holder with respect to the table is equal to the second predetermined speed. Since both the table and the film holder are moved when the pre-scanning is performed, even if the second driving mechanism drives the film holder to move relatively slowly, the film holder moves faster in the pre-scanning operation than in the main-scanning operation.

Alternatively, the first driving system may include a first driving mechanism which moves the table at the first predetermined speed, and the second driving system may include a second driving mechanism which moves the film holder with respect to the table at the second predetermined speed. In this case, the second driving system drives only the film holder to move when the pre-scanning is performed.

Optionally, the film is formed as a strip on which a plurality of image frames are formed along a longitudinal direction of the film. The film holder may have a slit in which the film strip is inserted along a longitudinal direction which is the auxiliary scanning direction of the film scanner. The film holder is formed with a plurality of openings, arranged in the auxiliary scanning direction, corresponding to the plurality of image frames. The film holder is moved in the longitudinal direction thereof by the second driving system.

Further, a window is formed on the table. A size of the window is substantially the same as each of the plurality of openings formed on the film holder, and an image is scanned through the window of the table and an opening of the film holder.

Optionally, the first driving system may include:
a rack provided at a portion of the table;
a first motor fixed to the film scanner; and
a pinion secured to a spindle of the first motor and engaged with the rack, and
second driving system may include:
a rack formed on a portion of the film holder;
a second motor fixed on the table; and
a pinion secured to a spindle of the second motor and engaged with the rack formed on the film holder.

DESCRIPTION OF THE EMBODIMENTS

Figure 1:
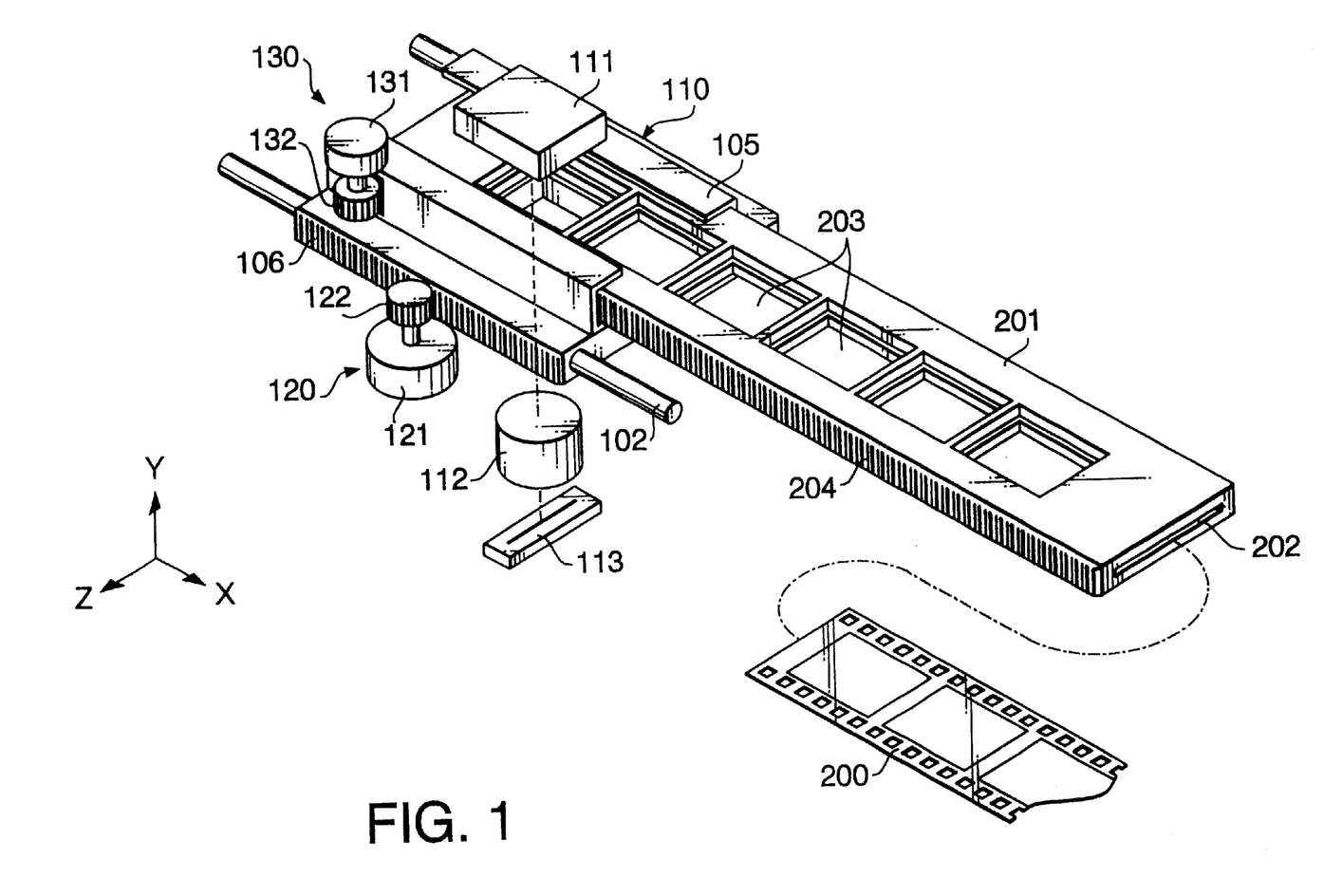
FIG. 1 shows a perspective view of a film scanner according to a first embodiment of the present invention.
Figure 2:
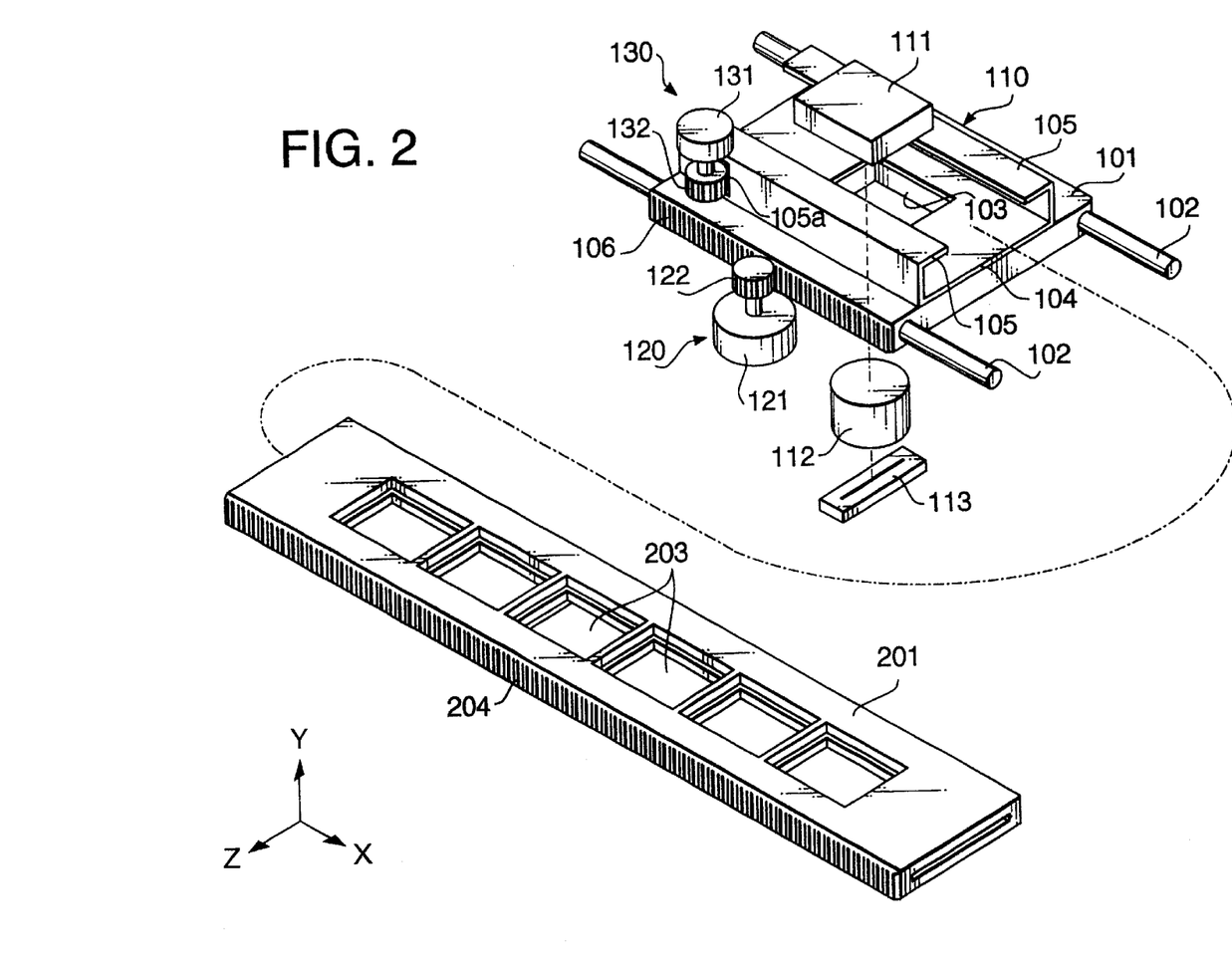
FIG. 2 is an exploded partial perspective view of the film scanner shown in FIG. 1.
Figure 3:
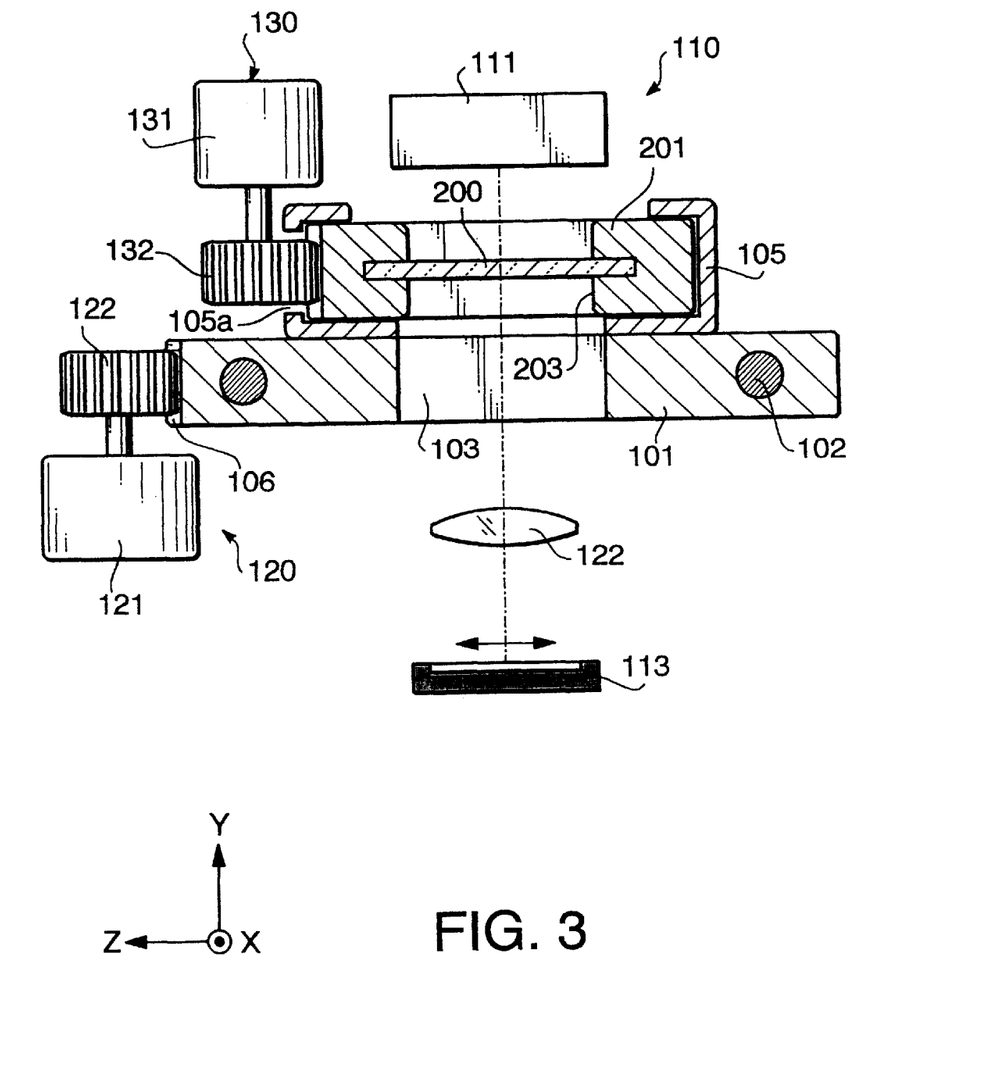
FIG. 3 is a cross sectional front view of the film scanner.

FIG. 1 schematically shows a perspective view of a part of a film scanner according to an embodiment of the present invention. FIG. 2 is an exploded perspective view of the part of the film scanner shown in FIG. 1, and FIG. 3 is a front view thereof.

In a housing (not shown) of the film scanner, a pair of guide rods 102 are provided. The guide rods 102 extend horizontally (X direction in FIG. 1), when the film scanner is placed for use. On the guide rods 102, a table 101 is movably mounted. Specifically, a pair of through holes extending in the X direction are formed on both side end portions of the table 101, and the guide rods 102 are slidably fitted therein. Thus, the table 101 is slidably supported by the guide rods 102.

On the table 101, a film holder 201 which holds a film to be scanned is to be held. At a predetermined area along the extending direction of the guide rods 102 (i.e., the X direction), an image reading section 110 is provided. Specifically, the image reading section 110 is provided with a diffused light source 111 which emits diffused light, an imaging lens 112, and a CCD line sensor 113. A light emitting surface of the diffused light source 111 views downward in FIG. 1, FIG. 2 or FIG. 3 (i.e., the light emitted by the diffused light source 111 proceeds in the Y direction). As shown in the drawings, the diffused light source 111 is provided on one side (i.e., an upper side) of the table 101. Below the light source 111 (and on a lower side of the table 101), the imaging lens 112 is located to converge the incident light on the CCD line sensor 113 including a plurality of linearly arranged CCD elements. The longitudinal direction, i.e., the direction in which the plurality of CCD elements are aligned (Z direction) is perpendicular to the extending direction of the guide rods 102. The direction in which the line sensor 113 captures the image is defined as a principal scanning direction (which is also indicated as Z direction).

The table 101 is movable along the guide rods 102. At a substantially central portion of the table 101, a rectangular scanning window 103 is formed. The scanning window 103 is formed through the table 101 in the direction of thickness thereof (i.e., in Y direction). A portion of a film located at the reading window 103 is subjected to the main scanning.

On an upper surface of the table 101, a rail unit 104 including a pair of rails 105 for holding the film holder 201 is provided (see FIG. 2). Each rail 105 has an L-shaped cross section portion as shown in FIG. 3. The film holder 201 is held by the pair of rails 105 such that the film holder 201 is slidable in the extending direction of the guide rods 102. On one side surface of the table 101, a rack 106 is integrally formed along the extending direction of the guide rods 102 (i.e., in the X direction).

A film 200 (see FIG. 1) to be held by the film holder 201 is a film strip which is made by cutting a 35 mm film so as to include six photograph frames. The film holder 201 is formed to be slightly greater than the film strip 200. Substantially at a center in a direction of the thickness thereof (i.e., in the Y direction in FIG. 3), a slit 202 for holding the film 200 is formed along the longitudinal direction thereof. Six rectangular frame windows 203 are formed along the longitudinal direction of the film holder 201 (i.e., along the X direction). Each frame window 203 is formed to be a through hole in the thickness direction (i.e., Y direction) of the film holder 201. The size of each frame window 203 corresponds to the size of the photographing frame formed on the film strip 200.

On one side surface of the film holder 201, a rack 204 is integrally provided in the longitudinal direction thereof (i.e., X direction). The film holder 201 is inserted between the pair of rails 105 on the table 101, and is moved along the rails 105 on the table 101 as shown in FIG. 1.

The scanner is provided with a scanning mechanism for executing an auxiliary scanning, i.e., for moving the film strip 200 in a direction perpendicular to the extending direction of the line sensor 113 (i.e., in the Z direction). The scanning mechanism is provided with a first driving mechanism 120 for driving the table 101 to move in the X direction, a second driving mechanism 130 for driving the film holder 201 in the X direction.

The first driving mechanism 120 is provided with a main-scanning motor 121 which is fixedly secured to the housing at a position adjacent to one of the guide rods 102. To a spindle shaft of the main-scanning motor 121, a pinion 122 is secured. The pinion 122 is engaged with the rack 106 formed on the table 101.

The second driving mechanism 130 is provided with a pre-scanning motor 131 mounted on the table 101. To the spindle shaft of the pre-scanning motor 131, a pinion 132 is secured, and the pinion 132 is engaged with the rack 204 formed on the film holder 201, via an opening 105a formed on a side surface of one of the rails 105.

The motor 121 and 131 are pulse motors, which revolve predetermined angular amount in response to one pulse within a pulse signal.

Figure 4:
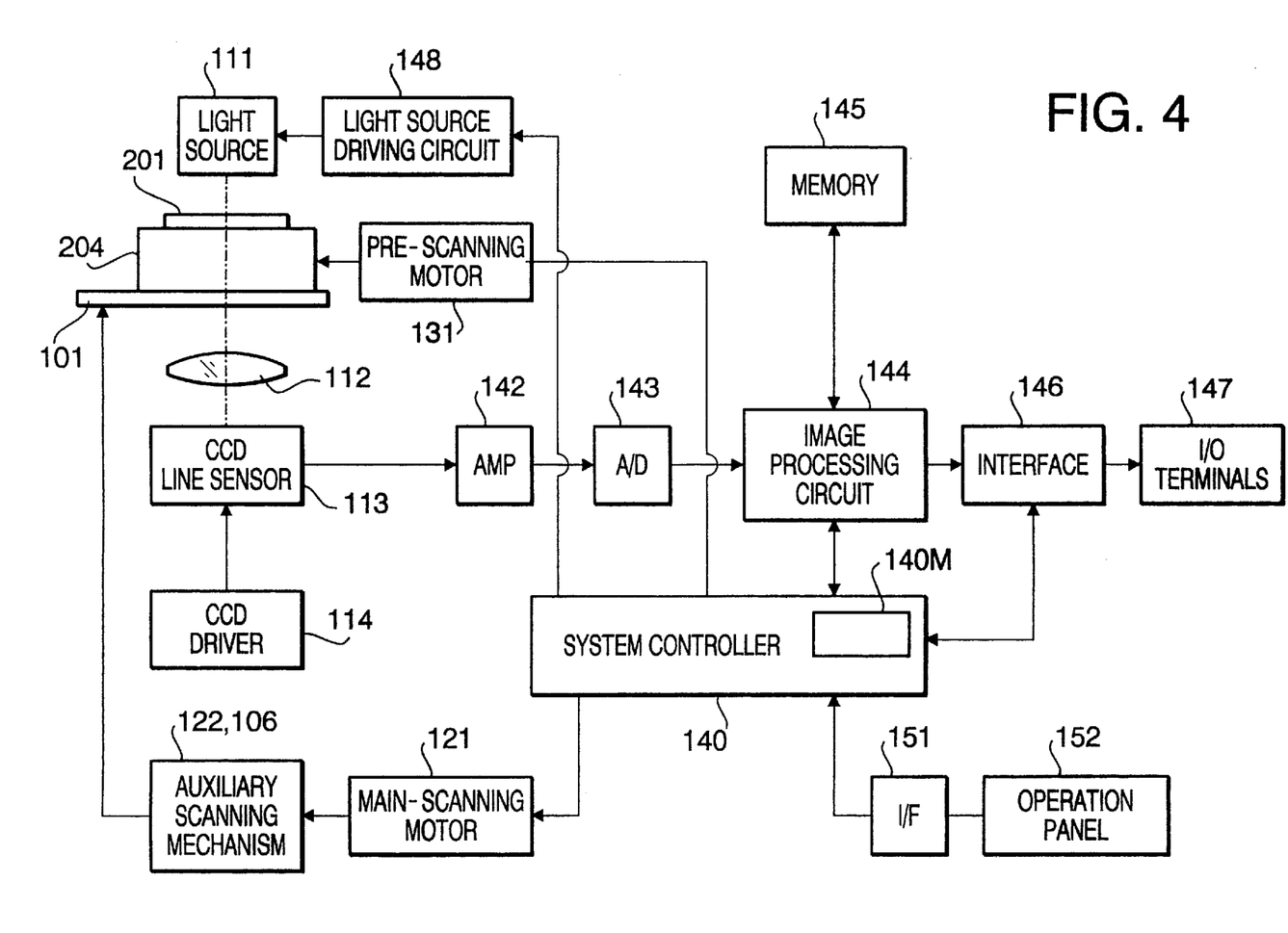
FIG. 4 is a block diagram illustrating a control system of the film scanner shown in FIG. 1.

FIG. 4 shows a control system of the film scanner.

The CCD line sensor 113 is driven by a line sensor driving circuit 141 which is controlled by a system controller 140. The signal representing a captured image and output by the CCD line sensor 113 is amplified by an amplifier 142, converted into a digital signal by an A/D converter 143. Then, a predetermined image processing is applied by an image processing circuit 144 to generate an image signal having a predetermined format. A memory 145 is provided for storing the processed image signal as an image data. For example, an IC card may be used as the memory 145. The image signal is applied to an output terminal 147 via an interface circuit 146. The output signal is transmitted from the terminal 147 to, for example, a (not shown) displaying device to display the image. The diffused light source 111 is driven by a light source driving circuit 148 which is controlled by the system controller 140. Movement of the main-scanning motor 121 and the pre-scanning motor 131 are also controlled by the system controller 140. The system controller 140 is also connected with an operation panel 152 via an interface 151. A control signal representing start/end of scanning operation and/or designating a frame to be scanned is input through the operation panel 152. The system controller 140 stores the instruction input through the operation panel 152 in a RAM 140M of the system controller 140. Further, based on the number of pulses applied to each of the main-scanning motor 121 and the pre-scanning motor 131, the system controller 140 detects the position of the table 101 and the film holder 201, and store the same in the RAM 140M.

Figure 5:
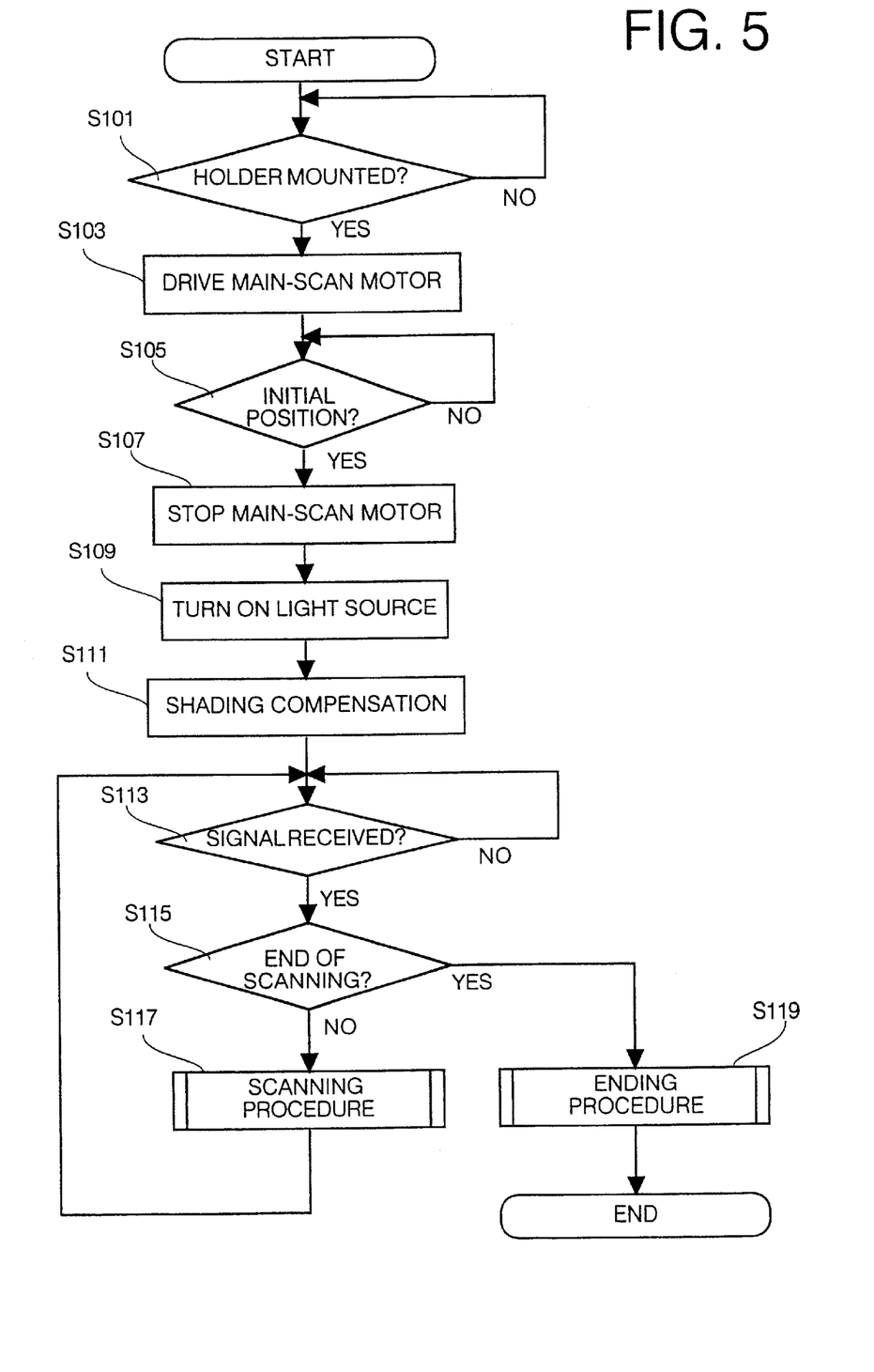
FIG. 5 is a flowchart illustrating a main procedure of the film scanner shown in FIG. 1.

Next, an operation of the film scanner will be described with reference to a flowchart shown in FIG. 5.

Initially, a film strip 200 to be scanned is inserted in the slit 202 of the film holder 201, and photographing frames are positioned at the frame windows 203 of the film holder 200. Then, the film holder 201 is inserted between the pair of rails 105 of the table 101. At this stage, a tip of the inserted film 201 is located before the reading window 103 of the table 101.

At S101, the system controller 140 waits for insertion of the film holder 201 (S101). When the film holder 201 is inserted (S101: YES), the system controller 140 drives the main-scanning motor 121 (S103), and the table 101 is located at an initial position (S105). The initial position is a position at which the table 101 has not yet reached the scanning position and is apart therefrom by a predetermined distance. When the table 101 is located at the initial position (S105: YES), the main-scanning motor 121 is stopped (S107). Then, the light source 111 is actuated to emit diffused light (S109). Since the table 101 has not yet reached the scanning position, the light is directly incident on the imaging lens 112, and is received by the line sensor 113. Based on the detection results of the line sensor 113, the image processing circuit 144 generates data for shading compensation (S111).

In S113, the system controller 140 waits for receipt of a signal instructing operation of the film scanner: pre-scanning or main-scanning and a frame number, or end of operation. When the received signal represents the end of the scanning operation (S115: YES), control goes to S119 where a sub-routine ENDING PROCEDURE is called. If the received signal represents the main-scanning or the pre-scanning operation, control proceeds to S117 where a sub-routine SCANNING PROCEDURE is called.

Figure 6:
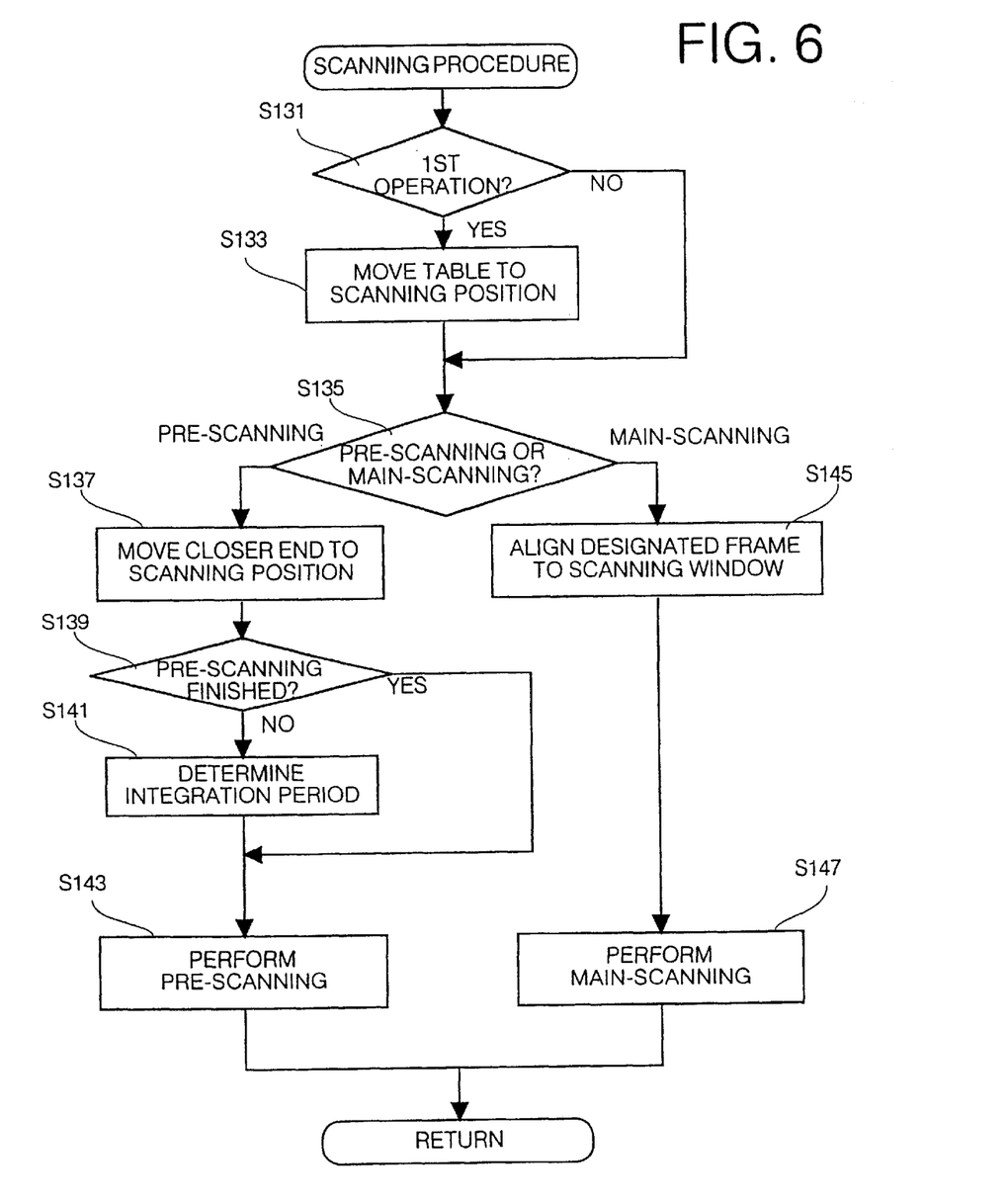
FIG. 6 is a flowchart illustrating a scanning procedure which is a sub-routine called in the main procedure shown in FIG. 5.

FIG. 6 shows a flowchart illustrating the SCANNING PROCEDURE according to the first embodiment of the invention. In S131, it is judged whether the step is executed first time. If step S131 is executed first time (S131: YES), the system controller 140 drives the main-scanning motor 12 to locate the table 101 at a scanning start position. The scanning start position is a position at which an end portion (front end portion) of the scanning window is located at the scanning position.

In S135, it is judged whether a pre-scanning or a main-scanning of a designated frame is to be done. If the pre-scanning is done, control proceeds to S137. In S137, the system controller 140 drives the pre-scan motor 131 to move the film holder 201 such that a front or rear end of the frame window 203 closer to the scanning position is located at the scanning position. In S139, it is judged whether the pre-scanning of the currently designated frame has been performed. If the pre-scanning of the frame has not yet been performed (S139: NO), an integration period of the CCD line sensor 113 is determined and stored in the RAM 140M (S141). If the pre-scanning of the designated frame has been performed (S139: YES), step S141 is skipped since the integration period has been determined and stored in the RAM 140M. Then, in S143, pre-scanning of the designated frame is performed by moving the film holder 201. When the pre-scanning is performed, if the front end of the frame window 203 has been located at the scanning position in S137, the film holder 201 is moved forward, while if the rear end of the frame window 203 has been located at the scanning position in S137, the film holder 201 is moved backward. When the pre-scanning has been performed (S143), control returns to the main procedure shown in FIG. 5.

If it is judged, in S135, that the main-scanning is to be performed, control proceeds to S145, where the frame window 203 corresponding to the designated frame is aligned with the scanning window 103 of the table 101. The size of the frame window 203 and the scanning window 103 are substantially the same, and when aligned, the front and rear ends of the frame window 203 are aligned with the front and rear ends of the scanning window 103, respectively. Then, in S147, the table 101 is moved to perform the main scanning. It should be noted that, if the pre-scanning of the designated frame has been done, the integration period therefor has been determined. In such a case, the determined integration period is used for the main-scanning. If the pre-scanning of the frame has not been done, and the main scanning is to be done, a default value of the integration period is used for the main-scanning. It should also be noted that when the front end of the scanning window 103 is located at the scanning position and one main-scanning operation is performed, the rear end of the scanning window 103 is located at the scanning position. Therefore, when a subsequent main-scanning is performed, the table 101 is moved in an opposite direction. After the main-scanning is performed in S147, control returns to the main procedure shown in FIG. 5.

Figure 7:
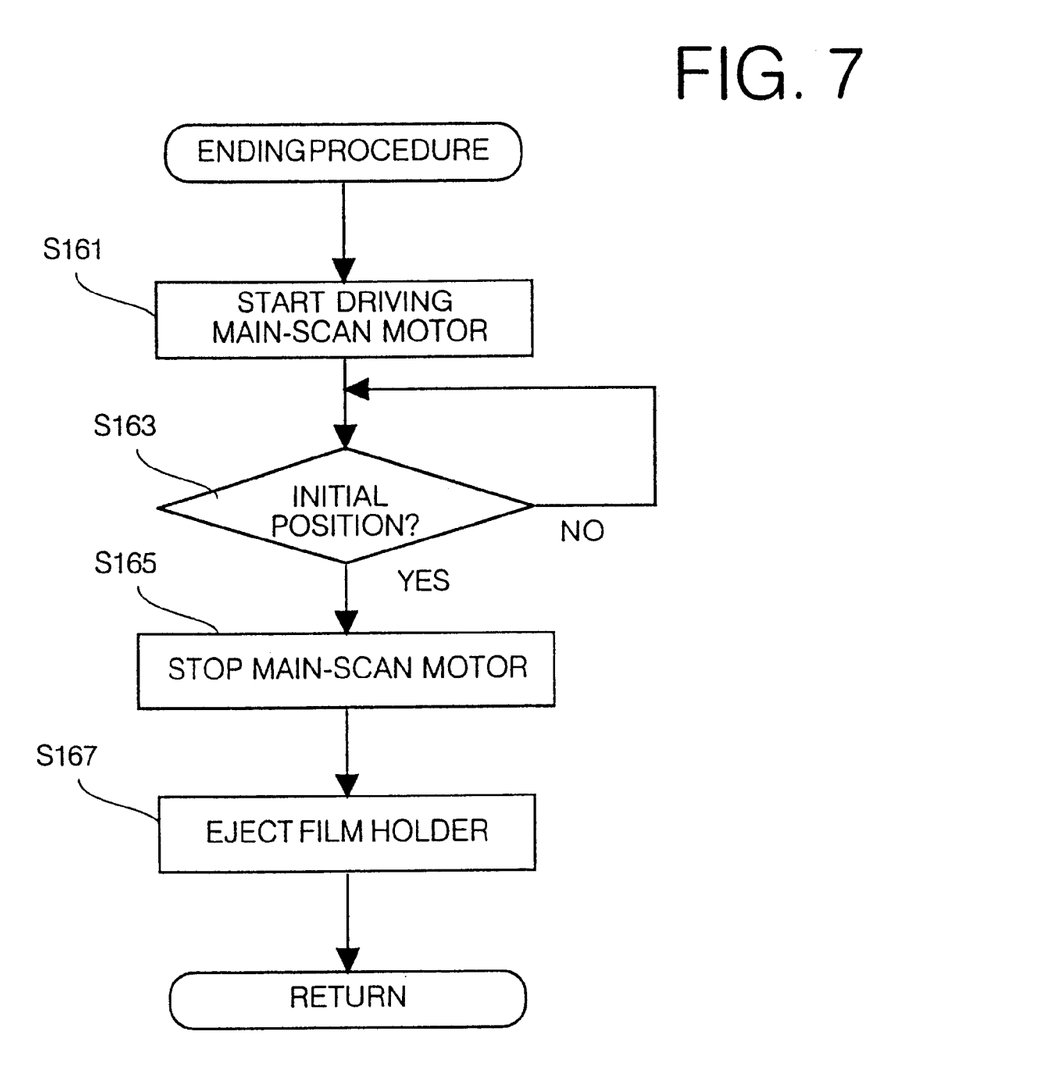
FIG. 7 is a flowchart illustrating an ending procedure which is a sub-routine called in the main procedure shown in FIG. 5.

FIG. 7 shows the ending procedure which is executed when it is judged, in S115 of the main procedure, that the scanning operation is to be finished.

When the ending procedure starts, the system controller 140 controls the main-scanning motor 121 to locate the table 101 to the initial position. When the table 101 has reached the initial position (S163: YES), the system controller 140 stops the main-scanning motor 121. Then, the system controller 140 drives the pre-scanning motor to eject the film holder 201 from the film scanner. Then, control returns to the main procedure shown in FIG. 5.

Figure 8:
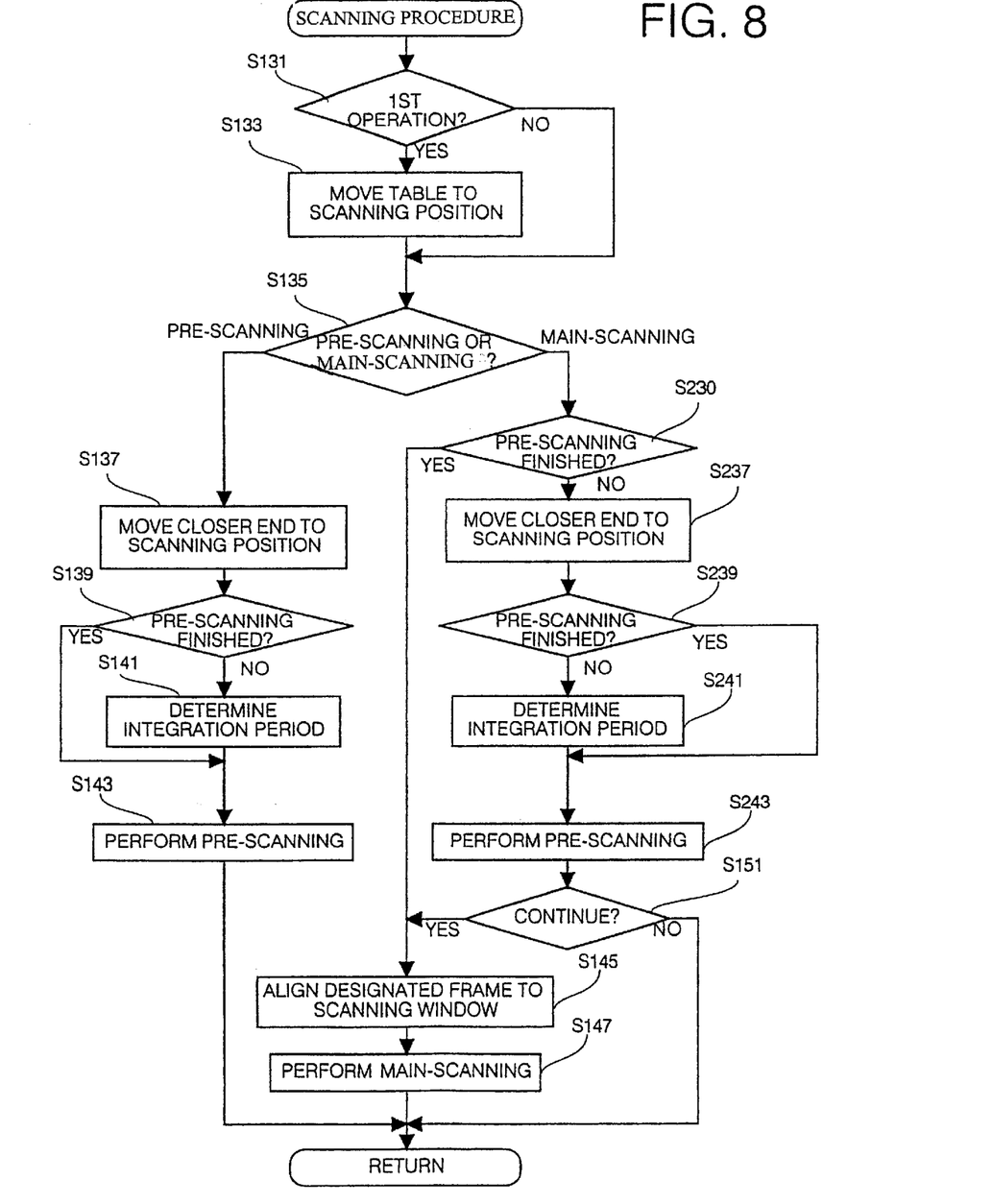
FIG. 8 is a flowchart illustrating a scanning procedure according to a second embodiment of the invention.

FIG. 8 is a flowchart illustrating a scanning procedure according to a second embodiment, which is a modified scanning procedure that can replace the scanning procedure shown in FIG. 6. In FIG. 8, steps similar to those in FIG. 6 are indicated to have the same step numbers and description thereof are omitted.

In the procedure shown in FIG. 8, when it is determined that the pre-scanning is to be performed and control proceeds from S135 to S137, operation that is the same as the first embodiment described above is executed. When the main-scanning is to be performed, in the second embodiment, if the pre-scanning has not yet been performed for the designated frame, the pre-scanning is firstly performed, and then the main-scanning is performed.

When the main-scanning is to be done, control proceeds from S135 to S230. In S230, it is judged whether the pre-scanning of the designated frame has been done. If the pre-scanning has been performed (S230: YES), then control proceeds to S145 which is similar to the procedure shown in FIG. 6. If the pre-scanning has not yet been performed (S230: NO), steps S237 through S243 are executed to perform the pre-scanning operation. The procedure of steps S237 through S243 is the same as the procedure of steps S137 through S143, and therefore description will be omitted. After the pre-scanning is performed in steps S237 through S243, a user may determine whether the procedure is to be continued to perform the main-scanning. If the user intends to proceed to the main-scanning, a predetermined key of the operation panel 152 may be operated, and in response to the operation of the key, control proceeds from S151 to S145. If the user does not intend to perform the main-scanning (S145: NO), another key may be operated, and control returns to the main procedure shown in FIG. 5.

Figure 10A:
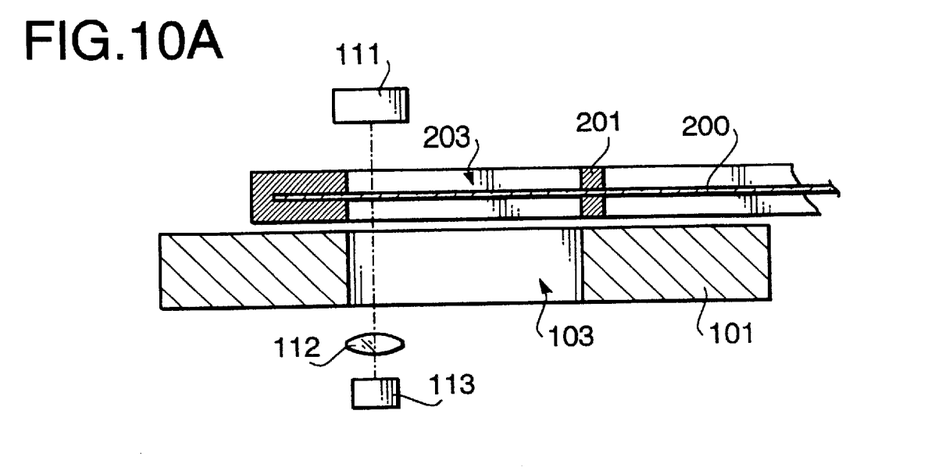
FIGS. 10A–10C schematically show a positional relationship between a table and a film holder when a scanning operation according to the first or second embodiment is executed.
Figure 10B:
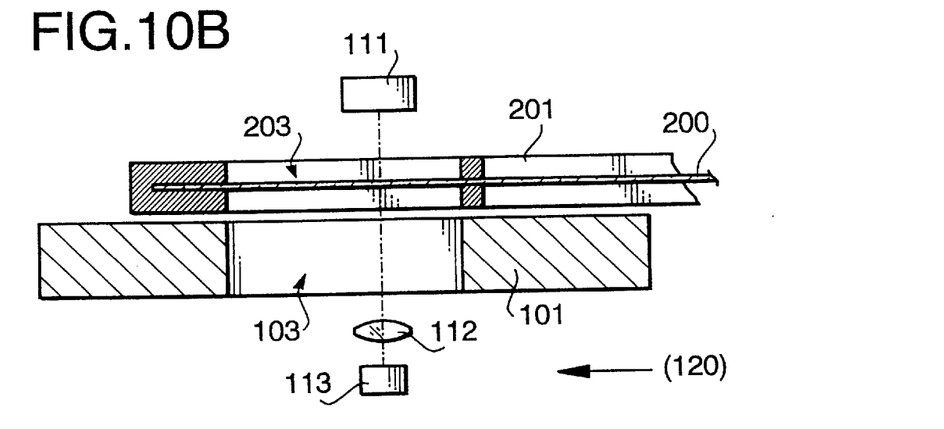
Figure 10C:
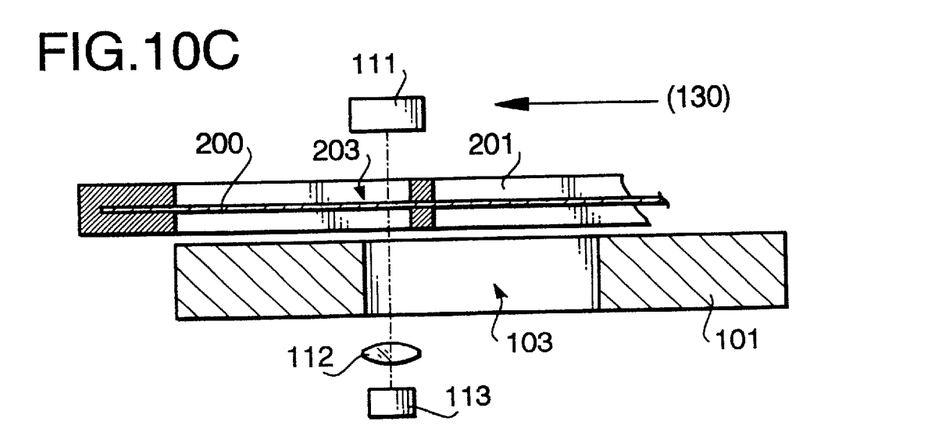

FIGS. 10A–10C schematically show movement of the table 101 and the film holder 201. FIG. 10A shows a condition where the front end portion of the table 101 is positioned at the scanning position, and the front end portion of the frame window 203 is also positioned at the scanning position (i.e., the frame window 203 is aligned with the scanning window 103). If the main scanning is to be performed, the main-scanning motor 121 is driven to rotate at a predetermined speed. By the rotation of the main-scanning motor 121, the pinion 122 is rotated, and due to engagement of the pinion 122 with the rack 106 of the table 101, the table 101 is driven along the guide bar 102 as shown in FIG. 10B. When the table 101 is moved by an amount corresponding to one frame, the main-scanning motor 121 is stopped. By this movement, with respect to the frame image on the film strip 200, the principal scanning (i.e., scanning in Z direction) is executed using the CCD line sensor 113, and by the movement of the table 101, the auxiliary scanning (i.e., scanning in X direction) is executed. Thus, the two-dimensional scanning of an image is executed. If the present invention is to be applied to a color scanner, RGB line sensors may be used and line-sequential principal-scanning may be executed to obtain RGB signals.

If the pre-scanning is to be executed when the table 101 and the film holder 201 are positioned as shown in FIG. 10A, only the pre-scanning motor 131 is driven and the pinion 132 is rotated. As the pinion 132 rotates, due to engagement between the pinion 132 and the rack 204 of the film holder 201, only the film holder 201 is moved on the table 101 as shown in FIG. 10C. In the first and second embodiments, the rotation speed of the motor 131 is twice as fast as that of the main-scanning motor 121, or more. The pitch of the auxiliary scanning is also set to be rough. Accordingly, the period necessary for performing the pre-scanning can be made relatively short. Similarly to the operation in the main-scanning, when a color scan is to be performed in the pre-scanning operation, the line-sequential scanning can be performed.

As above, when the main-scanning is performed, the table 101 is moved by the main scanning motor 121 to execute the auxiliary scanning, and when the pre-scanning is performed, the film holder 201 is moved by the pre-scanning motor 131 to execute the auxiliary scanning. Since the moving speed of the film holder 201 is faster than that of the table 101, the pre-scanning can be made faster than the main-scanning.

Further, when the main-scanning is executed subsequently, the table 101 moves in an opposite direction with respect to a previous main-scanning. Since the table 101 is not returned to a predetermined position (a scanning start position) as shown in FIG. 10A at each main-scanning, when the main-scanning is continuously executed, the operation can be done quickly.

Instead of making the pre-scanning motor 121 faster than the main-scanning motor 131, by making the pinion 132 of the pre-scanning motor 132 greater than the pinion 122 of the main scan motor 121, the moving speed of the film holder can also be made faster.

Hereinafter, a third embodiment of the invention will be described. The structure of the scanning device according to the third embodiment is similar to that of the first and second embodiment. In this embodiment, the speed of the pre-scanning motor 131 is substantially the same as the speed of the main-scanning motor 121.

In the third embodiment, when the main-scanning is performed, only the main scanning motor 121 is driven to move the table 101, while when the pre-scanning is performed, both the main scanning motor 121 and the pre-scanning motor 131 are driven simultaneously.

Figure 9:
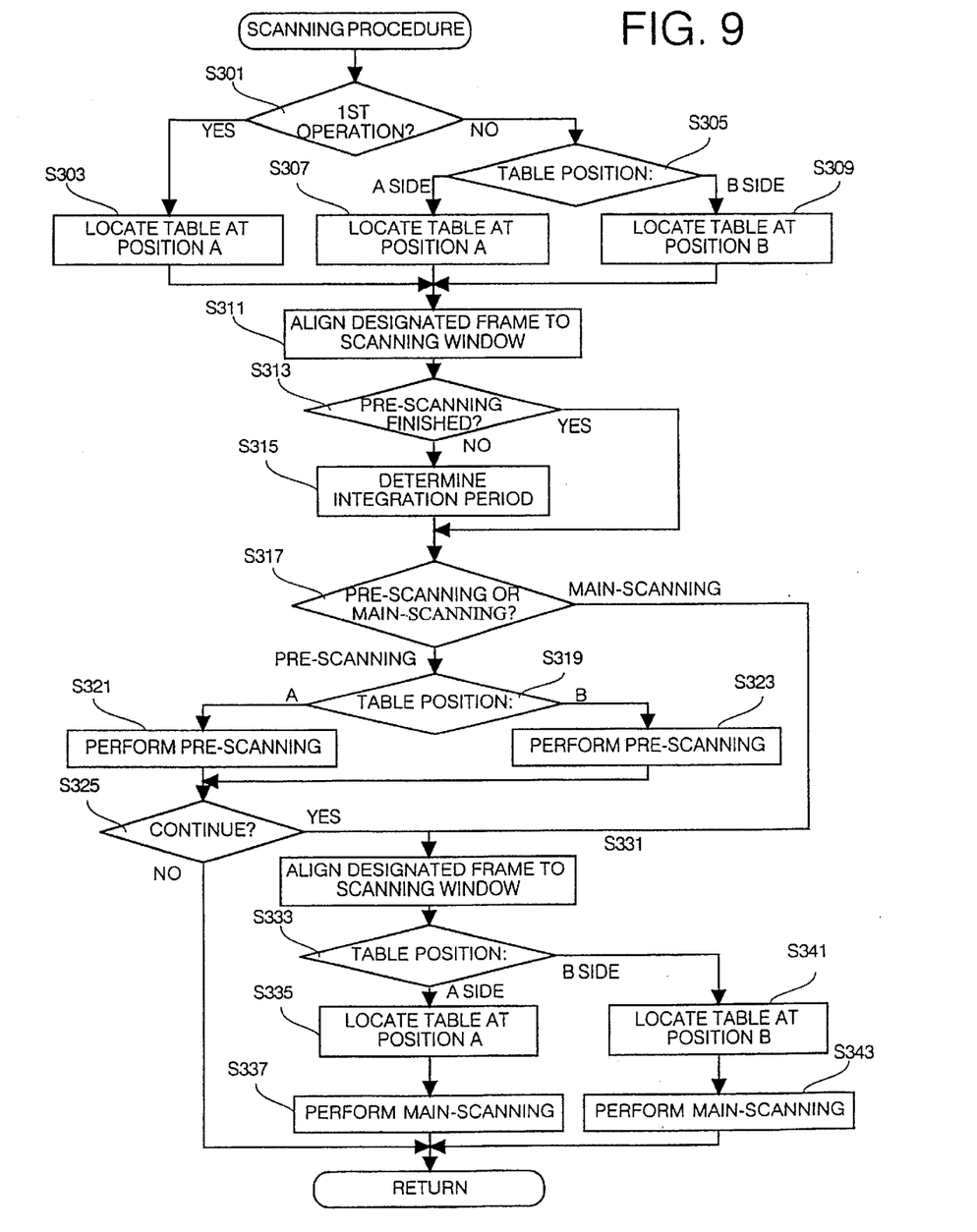
FIG. 9 is a flowchart illustrating a scanning procedure according to a third embodiment of the invention.

FIG. 9 is a flowchart illustrating a scanning procedure according to a third embodiment. The main procedure shown in FIG. 5 and the ending procedure shown in FIG. 7 can be adopted as they are in the third embodiment.

In S301, it is Judged whether the step S301 is being executed for the first time. If step S301 is being executed first time (S301: YES), the system controller 140 drives the main-scanning motor 121 to locate the table 101 at a scanning start position. The scanning start position is a position at which an end portion (front end portion) of the scanning window is located at the scanning position.

If step S301 has been executed before (S301: NO), it is judged whether the table is located on position A side or position B side. Position A is a position at which the front end portion of the scanning window 103 is located at the scanning position, and position B is a position where the rear end portion of the scanning window 103 is located at the scanning position. If the front end of the scanning window 103 is closer to the scanning position than the rear end thereof, it is judged that the table 101 is located on the position A side, otherwise the table 101 is located on the position B side.

If the table 101 is located on the position A side, control proceeds to S307. In S307, the system controller 140 controls the main-scanning motor 121 to locate the front end portion of the scanning window 103 at the scanning position (i.e., the table 101 is located at position A). If the table 101 is located on the position B side, the table 101 is moved such that the rear end portion of the scanning window 103 is located at the scanning position (S309) (i.e., the table 101 is located at position B).

After the table 101 has been located at position A or position B (S303, S307 or S309), the system controller 140 controls the pre-scanning motor 131 to align the frame window 203 corresponding to the designated frame with the scanning window 103 of the table 101 (S311). At this stage, it is judged whether a pre-scanning of the designated frame has been once performed (S313). If the pre-scanning has not yet been performed (S313: NO), in S315, the integration period for the frame is determined. If the pre-scanning has been performed, the integration period for the frame has been determined, step S315 is skipped.

In S317, it is judged whether a pre-scanning or a main-scanning of the designated frame is to be performed. If the pre-scanning is to be performed, control proceeds to S319 where the current table position is detected. If the table 101 is located at position A, control proceeds to S321. In this case, before the pre-scanning is executed, the front end portion of the scanning window 103 and the front end portion of the frame window are located at the scanning position. For the pre-scanning, the system controller 140 controls both the main-scanning motor 121 and the pre-scanning motor 131 to move the table 101 and the film holder 201 in a forward direction. Since the speeds of the main-scanning motor 121 and the pre-scanning motor 131 are substantially the same, the film holder 201 moves, with respect to the scanning position, twice as fast as the table 101. The pitch of the auxiliary scanning lines is of course increased, and therefore, the pre-scanning of a frame can be finished quickly.

If the table 101 is located at position B, control proceeds to S323. In this case, before the pre-scanning is executed, the rear end portion of the scanning window 103 and the rear end portion of the frame window are located at the scanning position. Accordingly, for the pre-scanning, the system controller 140 controls both the main-scanning motor 121 and the pre-scanning motor 131 to move the table 101 and the film holder 201 in a backward direction. Similarly to the pre-scanning performed in S321, since the speeds of the main-scanning motor 121 and the pre-scanning motor 131 are substantially the same, the film holder 201 moves, with respect to the scanning position, twice as fast as the table 101.

After the pre-scanning is performed in step S321 or S323, a user may determine whether the procedure is to be continued to perform the main-scanning. If the user intends to proceed to the main-scanning, a predetermined key of the operation panel 152 may be operated, and in response to the operation of the key, control proceeds from S325 to S331. If the user does not intend to perform the main-scanning (S325: NO), another key may be operated, the procedure shown in FIG. 9 is terminated, and control returns to the main procedure shown in FIG. 5.

When it is judged, in S317, that the main-scanning is to be performed, or when the user has determined to proceed to the main-scanning after the pre-scanning has been performed (S325: YES), control proceeds to S331.

In S331, the frame window 203 is aligned with the scanning window 103. In S333, it is judged whether the table 101 is located on position A side or position B side. If a previous scanning operation was the main-scanning, the table 101 is located on the position A or position B. In such a case, the table 101 need not necessarily be moved. However, if the previous scanning was the pre-scanning, a central portion of the scanning window 103 is located at the scanning position. In such a case, the table 101 is should be moved to a closer one of position A or position B.

If it is judged that the table 101 is located on the position A side, the system controller 140 drives the main-scanning motor 121 to locate the table 101 at position A (S335). Then, the main-scanning of the frame is performed by driving the main-scanning motor 121 to move the table 101 in the forward direction.

If it is judged that the table 101 is located on the position B side, the system controller 140 drives the main-scanning motor 121 to locate the table 101 at position B (S341). Thereafter, the main-scanning of the frame is performed by driving the main-scanning motor 121 to move the table 101 in the backward direction.

Figure 11A:
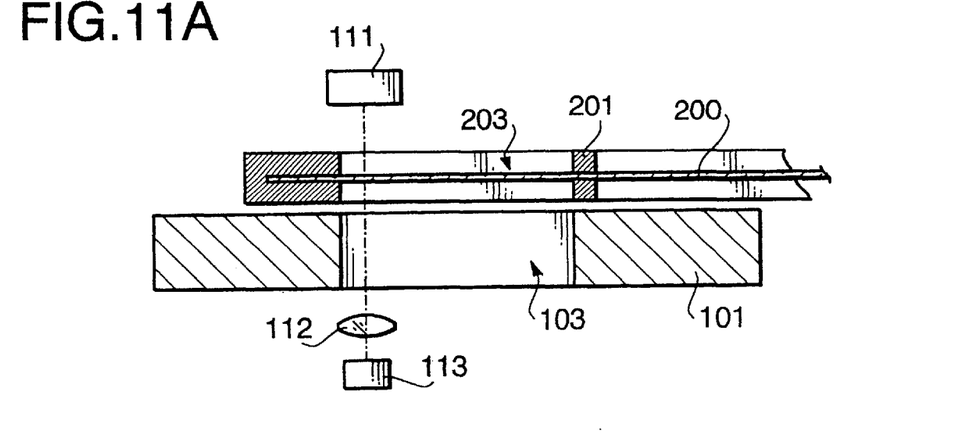
FIGS. 11A–11C schematically show a positional relationship between a table and a film holder when a pre-scanning operation according to the third embodiment is executed.
Figure 11B:
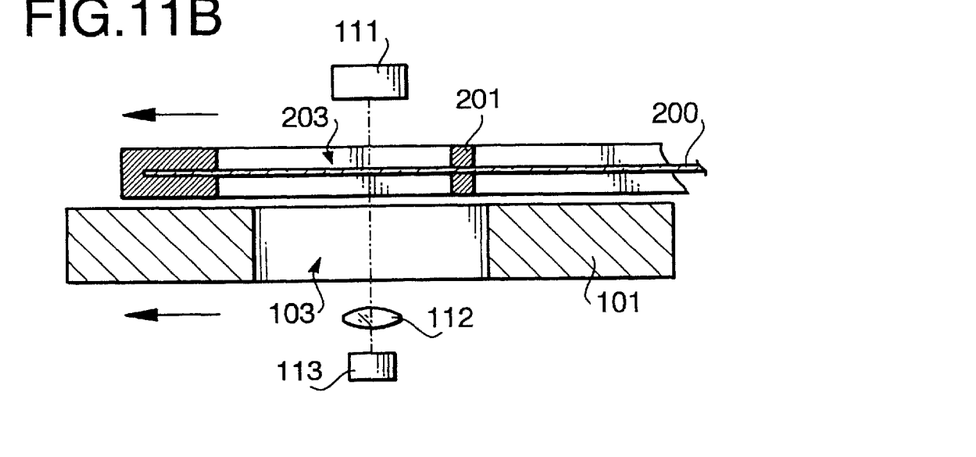
Figure 11C:
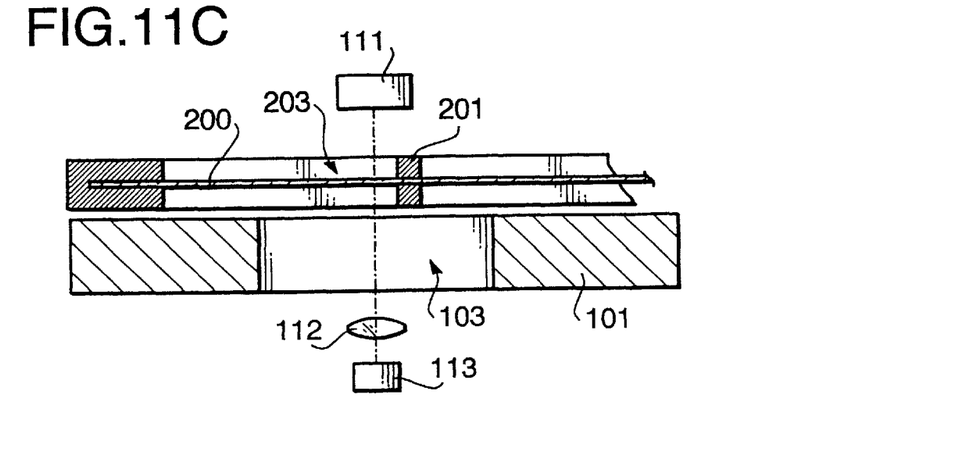

FIGS. 11A–11C schematically show movement of the table 101 and the film holder 201 according to the third embodiment. FIG. 11A is similar to FIG. 10A, and shows a condition where the front end portion of the table 101 is positioned at the scanning position, and the front end portion of the frame window 203 is also positioned at the scanning position. If the main scanning is to be performed, the main-scanning motor 121 is driven to rotate at a predetermined speed. By the rotation of the main-scanning motor 121, the pinion 122 is rotated, and due to engagement of the pinion 122 with the rack 106 of the table 101, the table 101 is driven along the guide bar 102 as shown in FIG. 11B.

When the table 101 is moved by an amount corresponding to one frame, the main-scanning motor 121 is stopped. By this movement, with respect to the frame image on the film strip 200, the principal scanning (i.e., scanning in Z direction) is executed using the CCD line sensor 113, and by the movement of the table 101, the auxiliary scanning (i.e., scanning in X direction) is executed. Thus, the two-dimensional scanning of an image is executed. If the present invention is to be applied to a color scanner, RGB line sensors may be used and line-sequential principal-scanning may be executed to obtain RGB signals.

If the pre-scanning is to be executed when the table 101 and the film holder 201 are positioned as shown in FIG. 11A, both the main-scanning motor 121 and the pre-scanning motor 131 are driven as shown in FIGS. 11B and 11C. The pitch of the auxiliary scanning, when the pre-scanning is performed, is set to be rough. It should be noted that, in the third embodiment, even if the speed of the pre-scanning motor 131 is slower than the main-scanning motor 131, the pre-scanning can be performed within a shorter period than the main-scanning. Accordingly, the period necessary for performing the pre-scanning can be made relatively short.

Similarly to the first embodiment, in the main-scanning and pre-scanning in the third embodiment, when a color scan is to be performed, the line-sequential scanning can be performed.

In the third embodiment, if the speed of the pre-scanning motor 131 is substantially equal to or faster than the speed of the main-scanning motor 121, the table may be located at position A every time when a scanning is performed. If the speed of the pre-scanning motor 131 is slower than the speed of the main-scanning motor 121, the table may be alternately located at position A and position B when a scanning is performed.

As described above, according to the present invention, the pre-scanning operation can be performed faster than the main-scanning operation.

The present disclosure relates to the subject matter contained in Japanese Patent Application No. HEI 10-374681, filed on Dec. 28, 1998, which is expressly incorporated herein by reference in its entirety.

What is claimed is:

1. A film scanner, comprising:
    a line sensor for capturing an image formed on a film in a principal scanning direction; and
    a scanning mechanism for moving the film relative to said line sensor in an auxiliary scanning direction, which is perpendicular to said principal scanning direction,
    wherein said scanning mechanism is provided with:
    a film holder for holding the film;
    a table for slidably mounting said film holder, said film holder being slidable in said auxiliary scanning direction; and
    a first driving system which drives said table in said auxiliary scanning direction at a first predetermined speed; and
    a second driving system which drives said film holder in said auxiliary scanning direction at a second predetermined speed, said second predetermined speed being faster than said first predetermined speed.

2. The film scanner according to claim 1, wherein said first driving system includes a first driving mechanism which moves said table at said first predetermined speed, and wherein said second driving system includes said first driving mechanism and a second mechanism which moves said film holder with respect to said table, a sum of said first predetermined speed and a speed at which said second mechanism moves said film holder with respect to said table being equal to said second predetermined speed.

3. The film scanner according to claim 1, wherein the film is formed as a strip on which a plurality of image frames are formed along a longitudinal direction of the film, wherein said film holder has a slit in which the film strip is inserted along a longitudinal direction thereof, the longitudinal direction of the film strip being the auxiliary scanning direction of said film scanner, said film holder being formed with a plurality of openings corresponding to said plurality of images and arranged in said auxiliary scanning direction, and wherein said film holder is moved in the longitudinal direction thereof by said second driving system.

4. The film scanner according to claim 3, wherein a window is formed on said table, a size of said window being substantially the same as each of said plurality of openings formed on said film holder, an image being scanned through said window of said table and an opening of said film holder.

5. The film scanner according to claim 1, wherein said first driving system includes a first driving mechanism which moves said table at said first predetermined speed, and wherein said second driving system includes a second driving mechanism which moves said film holder with respect to said table at said second predetermined speed.

6. The film scanner according to claim 5, wherein the film is formed as a strip on which a plurality of image frames are formed along a longitudinal direction of said film, wherein said film holder has a slit in which the film strip is inserted along a longitudinal direction thereof, the longitudinal direction of the film strip being the auxiliary scanning direction of said film scanner, said film holder is formed with a plurality of openings corresponding to said plurality of images and arranged in said auxiliary scanning direction, and wherein said film holder is moved in the longitudinal direction thereof by said second driving mechanism.

7. The film scanner according to claim 6, wherein a window is formed on said table, a size of said window being substantially the same as each of said plurality of openings formed on said film holder, an image being scanned through said window of said table and an opening of said film holder.

8. The film scanner according to claim 1,
wherein said first driving system includes:
a rack provided at a portion of said table;
a first motor fixed to said film scanner; and
a pinion secured to a spindle of said first motor and engaged with said rack, and
wherein said second driving system includes:
a rack formed on a portion of said film holder;
a second motor fixed on said table; and
a pinion secured to a spindle of said second motor and engaged with said rack formed on said film holder.

* * * * *